(12) United States Patent
Hwang et al.

(10) Patent No.: US 11,750,028 B2
(45) Date of Patent: Sep. 5, 2023

(54) WIRELESS CHARGING DEVICE HAVING AN INCLINED SURFACE TO RECEIVE A CHARGING RACK

(71) Applicant: Cheng Uei Precision Industry Co., LTD., New Taipei (TW)

(72) Inventors: Yuan-Yu Hwang, New Taipei (TW); Xiao-Kang Yang, Dong-Guan (CN); Qin-Xiang Liu, Dong-Guan (CN)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 249 days.

(21) Appl. No.: 17/408,229

(22) Filed: Aug. 20, 2021

(65) Prior Publication Data
US 2022/0416573 A1  Dec. 29, 2022

(30) Foreign Application Priority Data
Jun. 25, 2021  (CN) .......................... 202121434719.8

(51) Int. Cl.
| | |
|---|---|
| H01M 10/46 | (2006.01) |
| H02J 50/00 | (2016.01) |
| H01R 24/68 | (2011.01) |
| H02J 7/00 | (2006.01) |

(52) U.S. Cl.
CPC ............ H02J 50/005 (2020.01); H01R 24/68 (2013.01); H02J 7/0042 (2013.01)

(58) Field of Classification Search
CPC ........ H02J 7/0042; H02J 50/005; H02J 50/10; H01R 24/68

USPC .......................... 320/107, 108, 111, 114, 115
See application file for complete search history.

(56) References Cited

U.S. PATENT DOCUMENTS

| | | | | |
|---|---|---|---|---|
| 2015/0097519 A1* | 4/2015 | Chen | ....................... | H02J 50/10 |
| | | | | 320/108 |
| 2015/0162767 A1* | 6/2015 | Oh | ......................... | H04R 1/028 |
| | | | | 320/108 |
| 2016/0064987 A1* | 3/2016 | Sheu | ...................... | H02J 7/0042 |
| | | | | 320/108 |
| 2016/0259374 A1* | 9/2016 | Breiwa | ..................... | F16B 1/00 |

FOREIGN PATENT DOCUMENTS

| | | | | | |
|---|---|---|---|---|---|
| CN | 111106653 A | * | 5/2020 | | |
| CN | 214850548 U | * | 11/2021 | ............. | H02J 7/025 |
| DE | 202009003233 U1 | * | 7/2009 | ............. | H02J 7/025 |
| DE | 202019105853 U1 | * | 12/2020 | | |

\* cited by examiner

*Primary Examiner* — Edward Tso
(74) *Attorney, Agent, or Firm* — Cheng-Ju Chiang

(57) ABSTRACT

A wireless charging device includes a plug module, a rack and a wireless charger. The plug module has a top wall, and two opposite side walls connected with two opposite sides of the top wall. A front end of a top surface of the top wall of the plug module is defined as an inclined plane. The rack is mounted on the inclined plane of the plug module. A front end of a bottom surface of the rack is recessed inward to form a lower accommodating groove. The inclined plane is mounted in the lower accommodating groove. A top surface of the rack is recessed downward to form an upper accommodating groove. The wireless charger is mounted in the upper accommodating groove.

10 Claims, 4 Drawing Sheets

WIRELESS CHARGING DEVICE HAVING AN INCLINED SURFACE TO RECEIVE A CHARGING RACK

CROSS-REFERENCE TO RELATED APPLICATION

The present application is based on, and claims priority from, China Patent Application No. 202121434719.8, filed Jun. 25, 2021, the disclosure of which is hereby incorporated by reference herein in its entirety.

BACKGROUND OF THE INVENTION

1. Field of the Invention

The present invention generally relates to a wireless charging device, and more particularly to a wireless charging device with a rack.

2. The Related Art

A current wireless charger generally needs cooperating with a plug module, and then the wireless charger and the plug module are used. However, the plug module and the wireless charger on the market are independently designed, when a user wants to use the wireless charger to charge an electronic device, the user has to carry the plug module and the wireless charger, in that case, the wireless charger is inconvenient for the user to be used.

Therefore, it is necessary to provide an innovative wireless charging device, the innovative wireless charging device includes a wireless charger and a plug module, and the innovative wireless charging device combines the wireless charger with the plug module, so that the wireless charging device is used conveniently.

SUMMARY OF THE INVENTION

An object of the present invention is to provide a wireless charging device. The wireless charging device includes a plug module, a rack and a wireless charger. The plug module has a top wall, and two opposite side walls connected with two opposite sides of the top wall. A front end of a top surface of the top wall of the plug module is defined as an inclined plane. An upper portion of the inclined plane is recessed inward to form a notch. An upper portion of an outer surface of at least one side wall of the plug module is recessed inward to form at least one guiding groove. The at least one guiding groove penetrates through a rear of the top surface of the top wall of the plug module. The rack is mounted on the inclined plane of the plug module. A front end of a bottom surface of the rack is recessed inward to form a lower accommodating groove. The inclined plane is mounted in the lower accommodating groove. A rear end of a lower portion of an inner surface of at least one side wall of the lower accommodating groove protrudes inward to form at least one guiding rail. The at least one guiding rail is slidably mounted in the at least one guiding groove. A rear of a top wall of the lower accommodating groove defines an opening perpendicularly penetrating through the top wall of the lower accommodating groove. An inner surface of a front end wall of the opening extends towards an inner surface of a rear end wall of the opening to form an elastic piece. A bottom surface of a free end of the elastic piece protrudes downward to form a convex portion. The convex portion of the elastic piece is disposed corresponding to the notch. A top surface of the rack is recessed downward to form an upper accommodating groove. The wireless charger is mounted in the upper accommodating groove.

Another object of the present invention is to provide a wireless charging device. The wireless charging device includes a plug module, a rack and a wireless charger. The plug module has a top wall, and two opposite side walls connected with two opposite sides of the top wall. A front end of a top surface of the top wall of the plug module is defined as an inclined plane. The inclined plane is recessed inward to form a notch. Two outer surfaces of the two opposite side walls of the plug module are recessed inward to form two guiding grooves. The two guiding grooves penetrate through two sides of a rear of the top surface of the top wall of the plug module. The rack is mounted on the inclined plane of the plug module. A bottom surface of the rack is recessed inward to form a lower accommodating groove. The inclined plane is mounted in the lower accommodating groove. Two inner surfaces of two side walls of the lower accommodating groove protrude inward to form two guiding rails. The two guiding rails are slidably mounted in the two guiding grooves through two tops of the two guiding grooves. A top wall of the lower accommodating groove defines an opening perpendicularly penetrating through the top wall of the lower accommodating groove. An inner surface of a front end wall of the opening extends towards an inner surface of a rear end wall of the opening to form an elastic piece. The elastic piece is spaced from the inner surface of the rear end wall of the opening and two inner surfaces of two side walls of the opening. The elastic piece protrudes downward to form a convex portion. The convex portion of the elastic piece is buckled in the notch. A top surface of the rack is recessed downward to form an upper accommodating groove. At least one portion of an inner surface of a peripheral wall of the upper accommodating groove protrudes inward to form at least one limiting portion. The wireless charger is mounted in the upper accommodating groove. The at least one limiting portion is located to a top of the wireless charger, and the wireless charger is blocked by the at least one limiting portion.

Another object of the present invention is to provide a wireless charging device. The wireless charging device includes a plug module, a rack, a wireless charger and a charging cable. The plug module has a top wall. An upper surface of the top wall of the plug module is defined as an inclined plane. The rack is engaged with the inclined plane of the plug module. A top surface of the rack is recessed downward to form an upper accommodating groove. At least one portion of a peripheral wall of the upper accommodating groove has at least one locating groove. The at least one locating groove penetrates through the peripheral wall of the upper accommodating groove. At least one portion of an inner surface of the peripheral wall of the upper accommodating groove protrudes inward to form at least one limiting portion. The wireless charger is mounted in the upper accommodating groove. The at least one limiting portion is located to a top of the wireless charger. The charging cable is connected between the plug module and the wireless charger. One end of the charging cable passes through the at least one locating groove and is connected with the wireless charger.

As described above, the wireless charging device combines the plug module with the wireless charger via the rack, when a user uses the wireless charger, the wireless charger and the plug module are together used directly, so that the wireless charging device is used conveniently. As a result, the user proceeds with a wireless charging of a smart phone conveniently.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
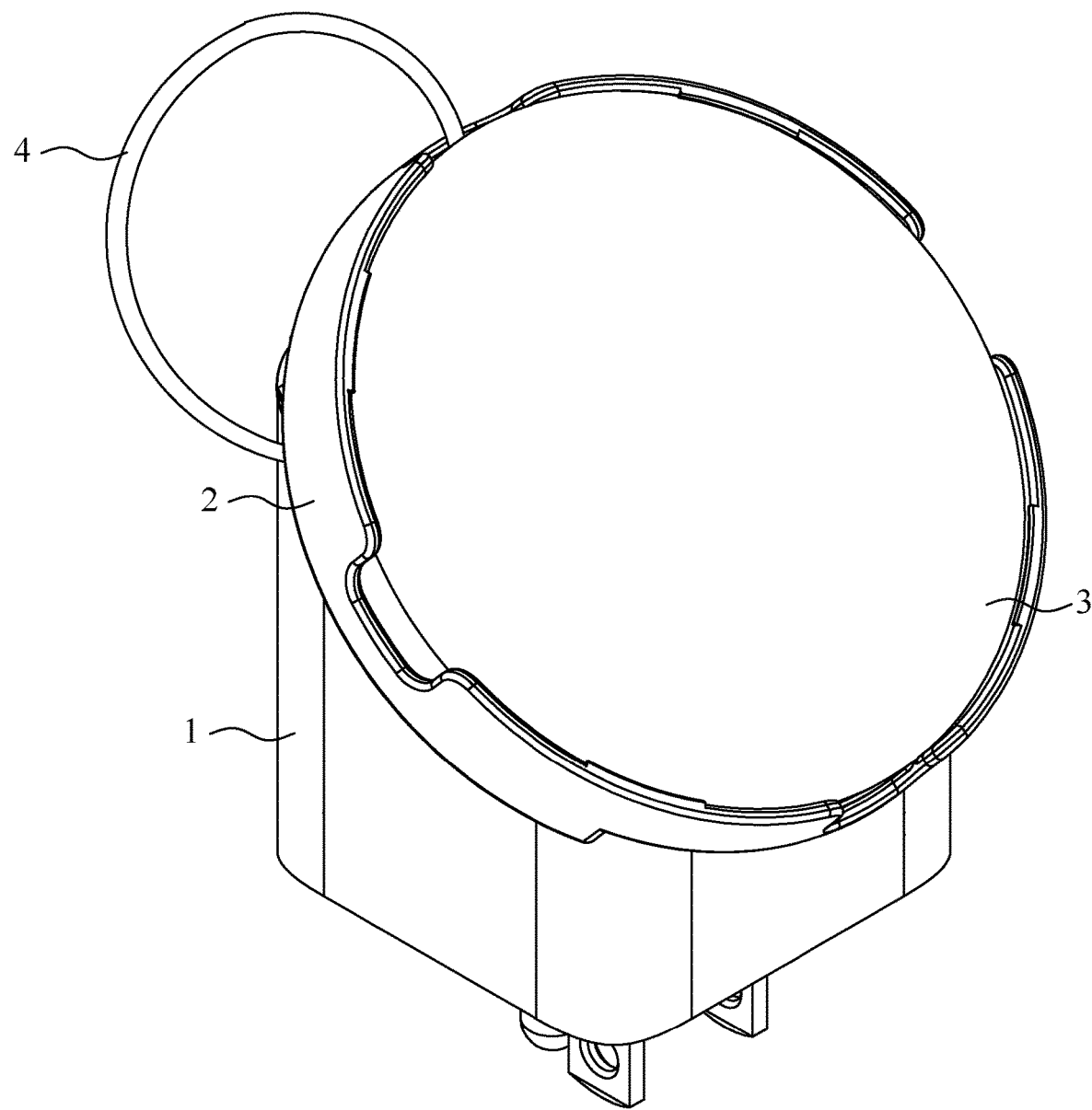
FIG. 1 is a perspective view of a wireless charging device in accordance with the present invention.

With reference to FIG. 1, a wireless charging device 100 in accordance with the present invention is shown. The wireless charging device 100 includes a plug module 1, a rack 2 and a wireless charger 3. The rack 2 is mounted on the plug module 1. The wireless charger 3 is mounted in the rack 2.

Figure 2:
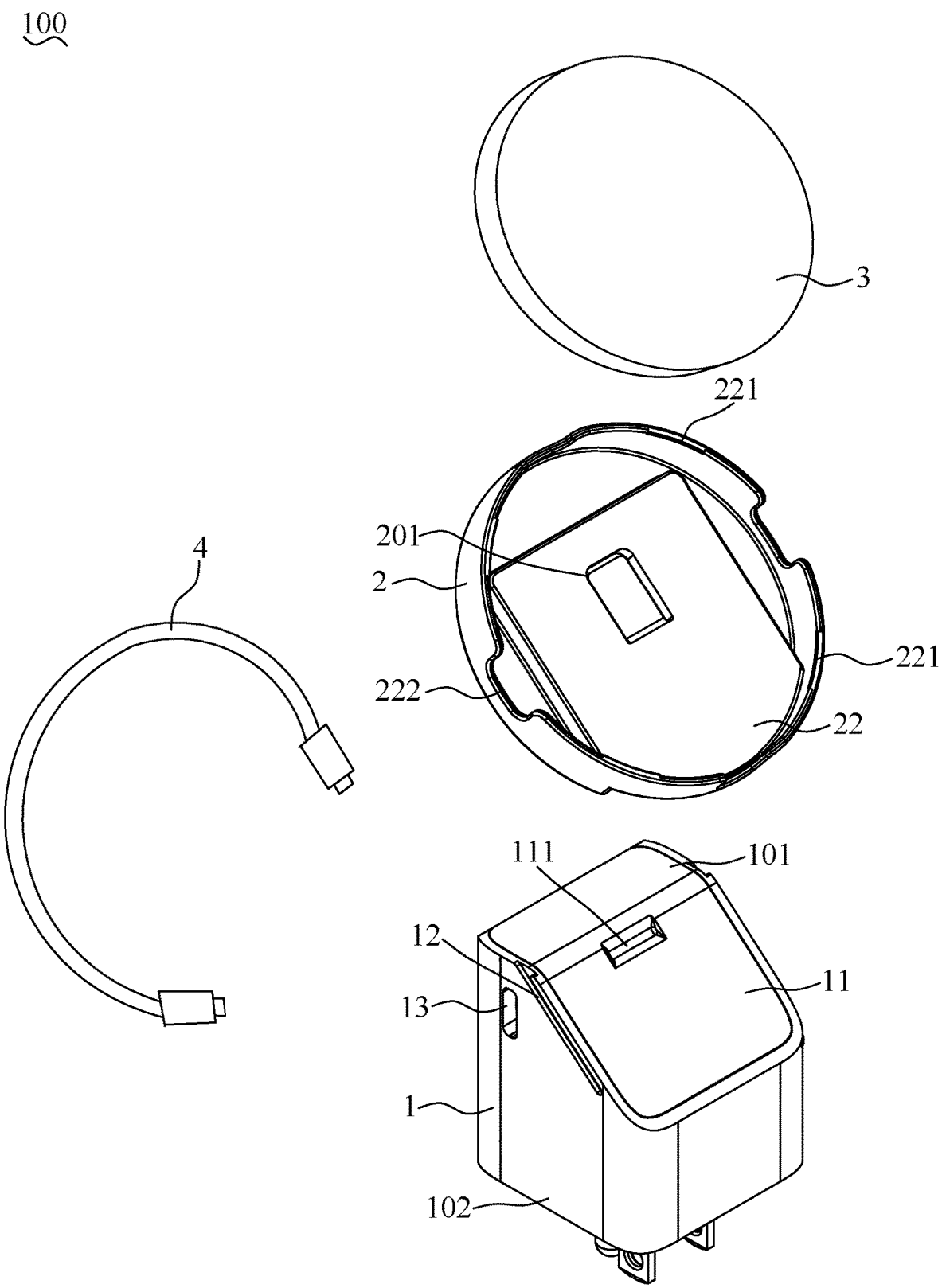
FIG. 2 is an exploded perspective view of the wireless charging device in accordance with the present invention.
Figure 3:
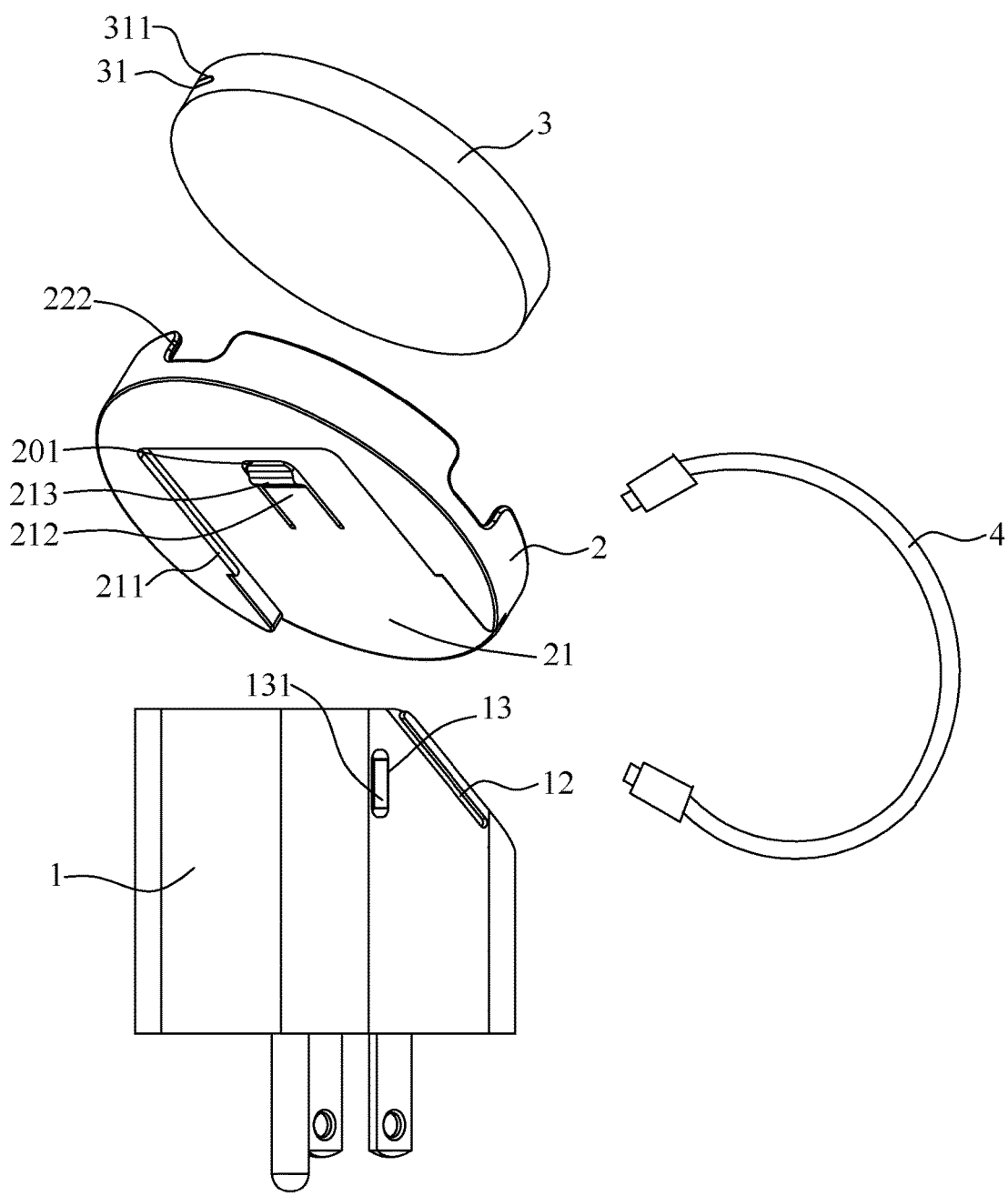
FIG. 3 is a diagrammatic drawing of the wireless charging device in accordance with the present invention.
Figure 4:
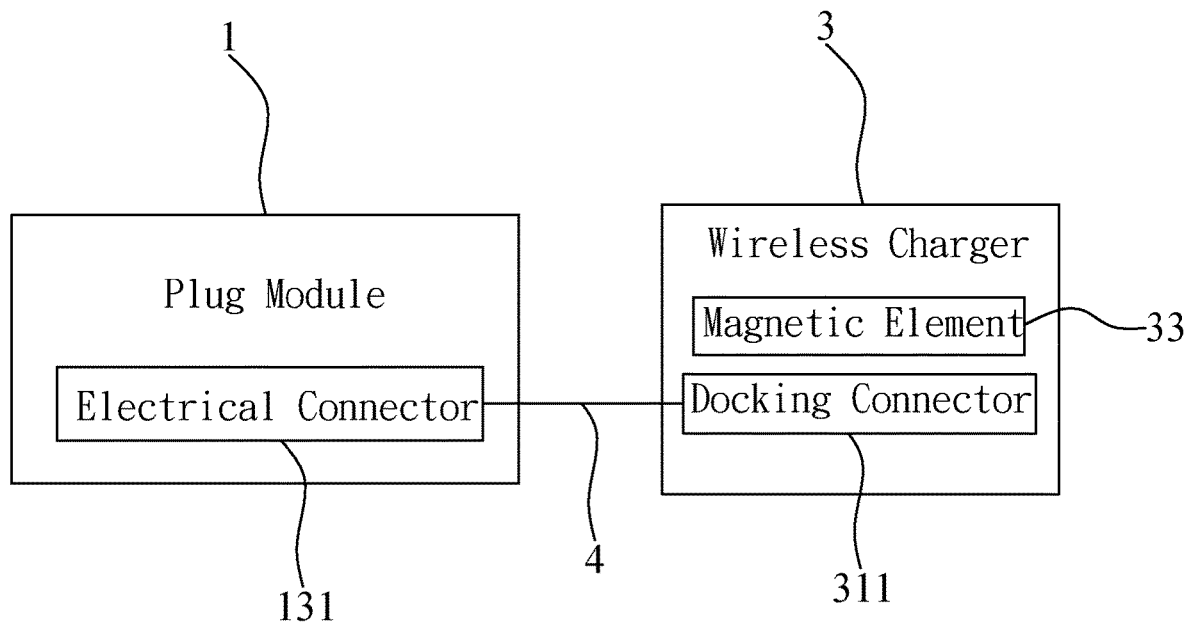
FIG. 4 is a partially block diagram of the wireless charging device in accordance with the present invention.

With reference to FIG. 2 to FIG. 4, the plug module 1 has a top wall 101, and two opposite side walls 102 connected with two opposite sides of the top wall 101. The two opposite side walls 102 are parallel with each other. An upper surface of the top wall 101 of the plug module 1 is defined as an inclined plane 11. A front end of a top surface of the top wall 101 of the plug module 1 is defined as the inclined plane 11. The inclined plane 11 slantwise extends frontward and downward from a rear of the inclined plane 11 to a front of the inclined plane 11. A middle of an upper portion of the inclined plane 11 is recessed inward to form a notch 111. An upper portion of an outer surface of at least one side wall 102 of the plug module 1 is recessed inward to form at least one guiding groove 12. The at least one guiding groove 12 penetrates through a rear of the top surface of the top wall 101 of the plug module 1. The at least one guiding groove 12 slantwise extends frontward and downward from a rear of the at least one guiding groove 12 to a front of the at least one guiding groove 12. The at least one guiding groove 12 slantwise extends along an extending direction of the inclined plane 11. The at least one guiding groove 12 is parallel with the inclined plane 11.

Specifically, two upper portions of two outer surfaces of the two opposite side walls 102 of the plug module 1 are recessed inward to form two guiding grooves 12. The two guiding grooves 12 penetrate through two sides of the rear of the top surface of the top wall 101 of the plug module 1. Each guiding groove 12 slantwise extends frontward and downward from the rear of each guiding groove 12 to the front of each guiding groove 12. One side wall 102 of the plug module 1 further has a first connecting hole 13 transversely penetrating through the one side wall 102 of the plug module 1. An inside of the plug module 1 is equipped with an electrical connector 131. The electrical connector 131 is received in the first connecting hole 13, and the electrical connector 131 is exposed in the first connecting hole 13.

The rack 2 is a circular shape. The rack 2 is mounted on the inclined plane 11 of the plug module 1. The rack 2 is engaged with the inclined plane 11 of the plug module 1. A middle of a front end of a bottom surface of the rack 2 is recessed inward to form a lower accommodating groove 21. The inclined plane 11 is mounted in the lower accommodating groove 21. A rear end of a lower portion of an inner surface of at least one side wall of the lower accommodating groove 21 protrudes inward to form at least one guiding rail 211. The at least one guiding rail 211 is slidably mounted in the at least one guiding groove 12, so that the rack 2 is fixed on the inclined plane 11 of the plug module 1 smoothly.

Specifically, two rear ends of two lower portions of two inner surfaces of two side walls of the lower accommodating groove 21 protrude inward to form two guiding rails 211. The two guiding rails 211 are slidably mounted in the two guiding grooves 12 through two tops of the two guiding grooves 12. A middle of a rear of a top wall of the lower accommodating groove 21 defines an opening 201 perpendicularly penetrating through the top wall of the lower accommodating groove 21. An inner surface of a front end wall of the opening 201 extends towards an inner surface of a rear end wall of the opening 201 to form an elastic piece 212. The elastic piece 212 is spaced from the inner surface of the rear end wall of the opening 201 and two inner surfaces of two side walls of the opening 201. A rear end of the elastic piece 212 is a free end of the elastic piece 212. A bottom surface of the free end of the elastic piece 212 protrudes downward to form a convex portion 213. The convex portion 213 of the elastic piece 212 is disposed corresponding to the notch 111. When the rack 2 is mounted on the inclined plane 11 of the plug module 1, the convex portion 213 of the elastic piece 212 enters the notch 111, the convex portion 213 of the elastic piece 212 is buckled in the notch 111, so that the rack 2 is fixed on the inclined plane 11 of the plug module 1, and the rack 2 is in a tilted state. The rack 2 gradually tilts downward from a rear of the rack 2 to a front of the rack 2.

A middle of a top surface of the rack 2 is recessed downward to form an upper accommodating groove 22. At least one portion of an inner surface of a peripheral wall of the upper accommodating groove 22 protrudes inward to form at least one limiting portion 221. Specifically, several portions of the inner surface of the peripheral wall of the upper accommodating groove 22 protrude inward to form a plurality of limiting portions 221.

Referring to FIG. 1 to FIG. 3, the wireless charger 3 is the circular shape. The wireless charger 3 is mounted in the upper accommodating groove 22. The at least one limiting portion 221 is located to a top of the wireless charger 3, and the wireless charger 3 is blocked by the at least one limiting portion 221, so that the wireless charger 3 is limited in the upper accommodating groove 22. Specifically, the plurality of the limiting portions 221 are located to the top of the wireless charger 3, and the wireless charger 3 are blocked by the plurality of the limiting portions 221, so that the wireless charger 3 is limited in the upper accommodating groove 22. A sidewall of the wireless charger 3 has a second connecting hole 31. An inside of the wireless charger 3 is equipped with a docking connector 311. The docking connector 311 is received in the second connecting hole 31, and the docking connector 311 is exposed in the second connecting hole 31. At least one portion of a top of the peripheral wall of the upper accommodating groove 22 has at least one locating groove 222. The at least one locating groove 222 penetrates through the top of the peripheral wall of the upper accommodating groove 22. The at least one locating groove 222 is disposed corresponding to the second connecting hole 31. Several portions of the top of the peripheral wall of the upper accommodating groove 22 are recessed downward to form a plurality of locating grooves 222. The second connecting hole 31 is optionally corresponding to each of the plurality of the locating grooves 222. The wireless charger 3 is combined with the plug module 1 via the rack 2.

The wireless charging device 100 is equipped with a charging cable 4. The charging cable 4 is connected between the plug module 1 and the wireless charger 3. Two ends of the charging cable 4 are connected between the electrical connector 131 in the first connecting hole 13 of the plug module 1 and the docking connector 311 in the second connecting hole 31 of the wireless charger 3, respectively. One end of the charging cable 4 passes through the at least one locating groove 222 of the rack 2 and is connected with the docking connector 311 of the second connecting hole 31 of the wireless charger 3. One end of the charging cable 4 passes through one locating groove 222 and is connected with the docking connector 311 of the second connecting hole 31 of the wireless charger 3. The other end of the charging cable 4 is connected with the electrical connector 131 of the first connecting hole 13.

Referring to FIG. 1 to FIG. 4, an inside of the wireless charger 3 is equipped with at least one magnetic element 33. When a user places a smart phone (not shown) on the wireless charger 3, the magnetic element 33 of the wireless charger 3 is attracted with a magnetic component in the smart phone, so that the smart phone is magnetically attached to the wireless charger 3. Current enters the wireless charger 3 through the plug module 1 and the charging cable 4 to provide required electric power for the wireless charger 3 at the time of the wireless charger 3 proceeding with a wireless charging of the smart phone.

When the plug module 1 of the wireless charging device 100 is inserted into a desktop socket, at the same time, the wireless charger 3 is tilted due to the inclined plane 11. The wireless charger 3 tilts downward from a rear of the wireless charger 3 to a front of the wireless charger 3. The user may face towards the inclined plane 11, so that the user places the smart phone on the wireless charger 3 conveniently or the user removes the smart phone from the wireless charger 3 conveniently. When the smart phone is attached to the wireless charger 3, the user is also able to face towards a screen of the smart phone by virtue of a tilted state of the smart phone, the smart phone is charged by the wireless charger 3, and the screen of the smart phone displays information, so that the user is able to see the information of the screen at the time of charging the smart phone.

As described above, the wireless charging device 100 combines the plug module 1 with the wireless charger 3 via the rack 2, when the user uses the wireless charger 3, the wireless charger 3 and the plug module 1 are together used directly, so that the wireless charging device 100 is used conveniently. As a result, the user proceeds with the wireless charging of the smart phone conveniently.

What is claimed is:

1. A wireless charging device, comprising:
a plug module having a top wall, and two opposite side walls connected with two opposite sides of the top wall, a front end of a top surface of the top wall of the plug module being defined as an inclined plane, an upper portion of the inclined plane being recessed inward to form a notch, an upper portion of an outer surface of at least one side wall of the plug module being recessed inward to form at least one guiding groove, the at least one guiding groove penetrating through a rear of the top surface of the top wall of the plug module;
a rack mounted on the inclined plane of the plug module, a front end of a bottom surface of the rack being recessed inward to form a lower accommodating groove, the inclined plane being mounted in the lower accommodating groove, a rear end of a lower portion of an inner surface of at least one side wall of the lower accommodating groove protruding inward to form at least one guiding rail, the at least one guiding rail being slidably mounted in the at least one guiding groove, a rear of a top wall of the lower accommodating groove defining an opening perpendicularly penetrating through the top wall of the lower accommodating groove, an inner surface of a front end wall of the opening extending towards an inner surface of a rear end wall of the opening to form an elastic piece, a bottom surface of a free end of the elastic piece protruding downward to form a convex portion, the convex portion of the elastic piece being disposed corresponding to the notch, a top surface of the rack being recessed downward to form an upper accommodating groove; and
a wireless charger mounted in the upper accommodating groove.

2. The wireless charging device as claimed in claim 1, wherein at least one portion of an inner surface of a peripheral wall of the upper accommodating groove protrudes inward to form at least one limiting portion, the at least one limiting portion is located to a top of the wireless charger, and the wireless charger is blocked by the at least one limiting portion.

3. The wireless charging device as claimed in claim 1, wherein one side wall of the plug module has a first connecting hole transversely penetrating through the one side wall of the plug module, a sidewall of the wireless charger has a second connecting hole, the wireless charging device is equipped with a charging cable, two ends of the charging cable are connected with the first connecting hole of the plug module and the second connecting hole of the wireless charger, respectively.

4. The wireless charging device as claimed in claim 3, wherein at least one portion of a top of a peripheral wall of the upper accommodating groove has at least one locating groove, the at least one locating groove penetrates through the top of the peripheral wall of the upper accommodating groove, the at least one locating groove is disposed corresponding to the second connecting hole, one end of the charging cable passes through the at least one locating groove and is connected with the second connecting hole of the wireless charger.

5. The wireless charging device as claimed in claim 3, wherein an inside of the plug module is equipped with an electrical connector, the electrical connector is received in the first connecting hole, and the electrical connector is exposed in the first connecting hole.

6. The wireless charging device as claimed in claim 5, wherein an inside of the wireless charger is equipped with a docking connector, the docking connector is received in the second connecting hole, and the docking connector is exposed in the second connecting hole, the two ends of the charging cable are connected between the electrical connector in the first connecting hole and the docking connector in the second connecting hole, respectively.

7. The wireless charging device as claimed in claim 1, wherein an inside of the wireless charger is equipped with at least one magnetic element.

8. The wireless charging device as claimed in claim 1, wherein the inclined plane slantwise extends frontward and downward from a rear of the inclined plane to a front of the inclined plane.

9. A wireless charging device, comprising:

a plug module having a top wall, and two opposite side walls connected with two opposite sides of the top wall, a front end of a top surface of the top wall of the plug module being defined as an inclined plane, the inclined plane being recessed inward to form a notch, two outer surfaces of the two opposite side walls of the plug module being recessed inward to form two guiding grooves, the two guiding grooves penetrating through two sides of a rear of the top surface of the top wall of the plug module;

a rack mounted on the inclined plane of the plug module, a bottom surface of the rack being recessed inward to form a lower accommodating groove, the inclined plane being mounted in the lower accommodating groove, two inner surfaces of two side walls of the lower accommodating groove protruding inward to form two guiding rails, the two guiding rails being slidably mounted in the two guiding grooves through two tops of the two guiding grooves, a top wall of the lower accommodating groove defining an opening perpendicularly penetrating through the top wall of the lower accommodating groove, an inner surface of a front end wall of the opening extending towards an inner surface of a rear end wall of the opening to form an elastic piece, the elastic piece being spaced from the inner surface of the rear end wall of the opening and two inner surfaces of two side walls of the opening, the elastic piece protruding downward to form a convex portion, the convex portion of the elastic piece being buckled in the notch, a top surface of the rack being recessed downward to form an upper accommodating groove, at least one portion of an inner surface of a peripheral wall of the upper accommodating groove protruding inward to form at least one limiting portion; and a wireless charger mounted in the upper accommodating groove, the at least one limiting portion being located to a top of the wireless charger, and the wireless charger being blocked by the at least one limiting portion.

10. A wireless charging device, comprising:

a plug module having a top wall, an upper surface of the top wall of the plug module being defined as an inclined plane;

a rack engaged with the inclined plane of the plug module, a top surface of the rack being recessed downward to form an upper accommodating groove, at least one portion of a peripheral wall of the upper accommodating groove having at least one locating groove, the at least one locating groove penetrating through the peripheral wall of the upper accommodating groove, at least one portion of an inner surface of the peripheral wall of the upper accommodating groove protruding inward to form at least one limiting portion;

a wireless charger mounted in the upper accommodating groove, the at least one limiting portion being located to a top of the wireless charger; and a charging cable connected between the plug module and the wireless charger, one end of the charging cable passing through the at least one locating groove and being connected with the wireless charger.

\* \* \* \* \*